United States Patent [19]
Canter

[11] 3,718,355
[45] Feb. 27, 1973

[54] SEAL

[76] Inventor: Richard S. Canter, 20 Clent Road, Great Neck, N.Y. 11021

[22] Filed: Aug. 27, 1971

[21] Appl. No.: 175,669

Related U.S. Application Data

[63] Continuation-in-part of Ser. No. 97,894, Dec. 14, 1970.

[52] U.S. Cl. ............................292/321, 24/16 PB
[51] Int. Cl. ..............................................B65d 63/00
[58] Field of Search ..........24/16 PB, 30.5 PB, 208.3; 292/320, 321, 318; 40/22

[56] References Cited

UNITED STATES PATENTS

| | | | |
|---|---|---|---|
| 2,610,879 | 9/1952 | Pope | 292/320 |
| 3,367,701 | 2/1968 | Wenk | 292/321 |
| 2,283,125 | 5/1942 | Powell | 24/208.3 |
| 2,977,145 | 3/1961 | Rifkin | 24/16 PB |
| 3,114,184 | 12/1963 | Bigaouette | 24/16 PB |
| 3,128,114 | 4/1964 | Nierhaus | 292/320 |
| 3,149,869 | 9/1964 | Chamberlin | 292/320 |

*Primary Examiner*—Bernard A. Gelak
*Attorney*—Edward Halle, Esq.

[57] ABSTRACT

A tamper-proof seal comprising a strap-like body portion generally having sealing means at the ends of the body portion so that the body portion can be placed through a hasp or other locking means to provide a locking element. The body portion is then looped around and fastened by the sealing means at each end thereof to make a permanent tamper-proof seal. The sealing means comprises a socket portion and a plug portion having a frame construction. There is a lateral locking surface in each portion which provides a permanent seal, and there is provision by means of a resilient coupling to make the seal by deforming the lateral locking surface of the plug within the plug frame.

16 Claims, 14 Drawing Figures

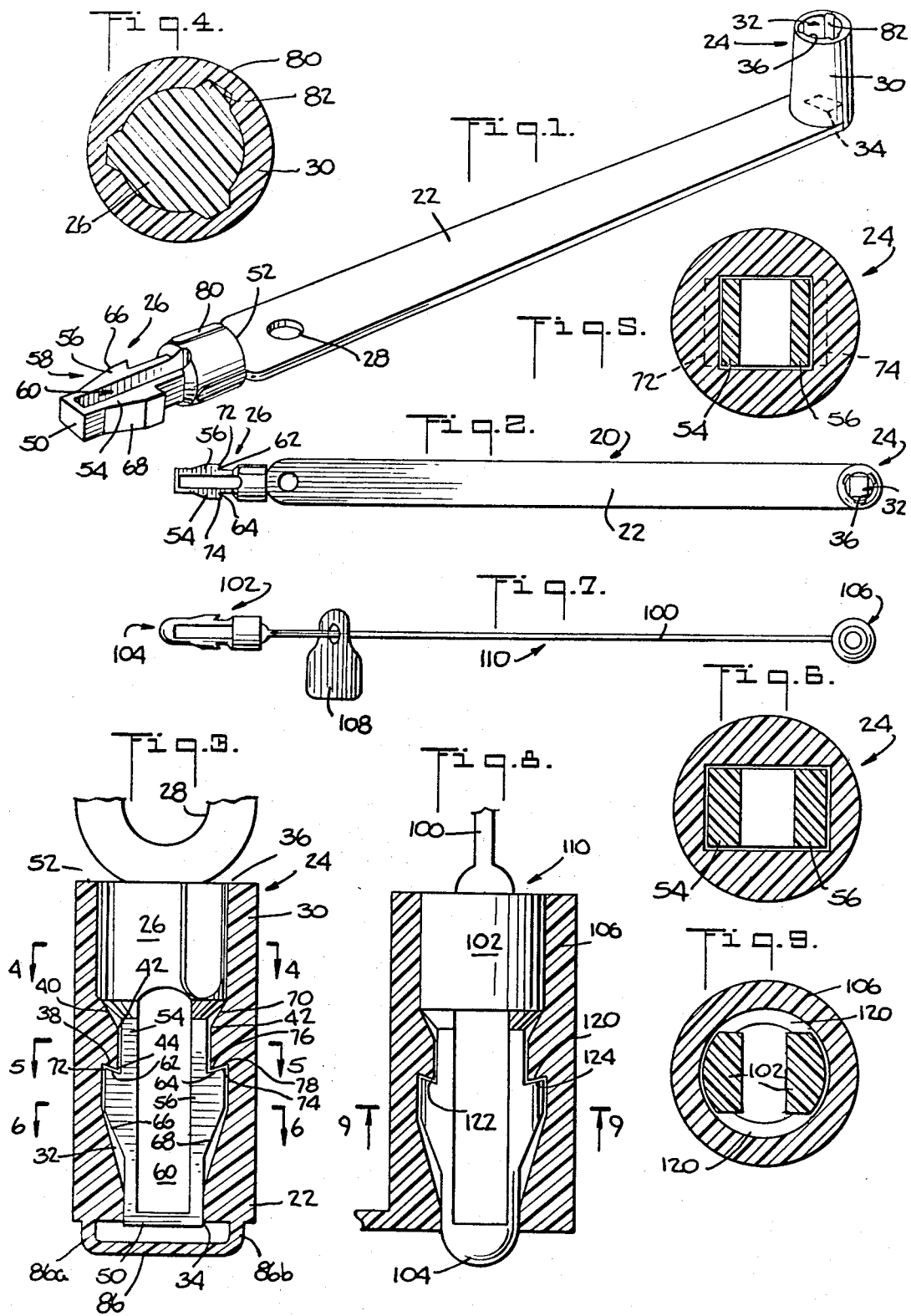

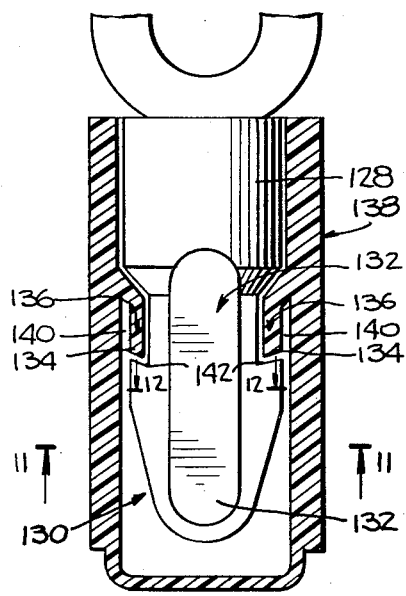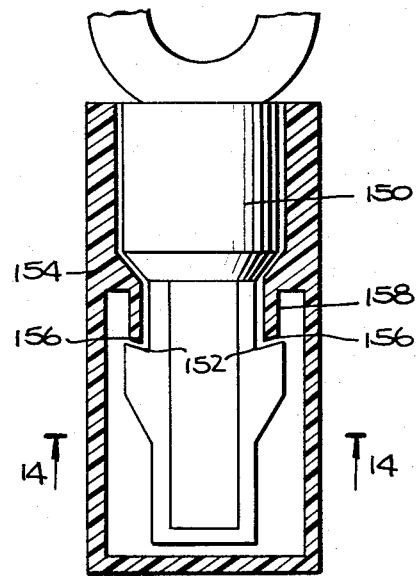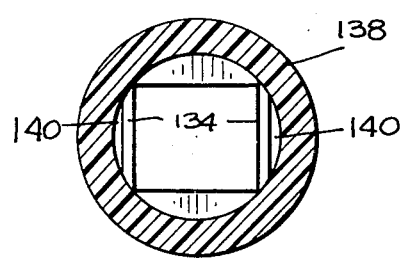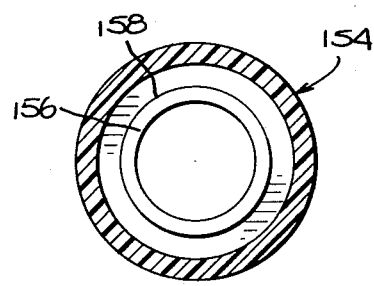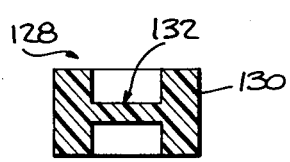

SEAL

This is a continuation in part of application for U.S. Letters Pat., Ser. No. 97,894 filed by the applicant on Dec. 14, 1970.

SUMMARY OF THE INVENTION

This invention relates to tamper-proof seals. An object of the invention is to provide a tamper-proof seal with security features which is easy to manufacture, inexpensive to produce and easy to use.

It is a further object of this invention to provide such a seal which includes a deformable resilient coupling providing a permanent seal in which the movable resilient sealing element is provided with a construction of great strength.

Further objects and advantages will appear in the specification hereinbelow.

THE DRAWINGS

In the drawings:

FIG. 1 is a perspective view;

FIG. 2 is a top plan view of the seal shown in FIG. 1 slightly reduced in size;

FIG. 3 is a greatly enlarged sectional detail, partly in section and partly in elevation;

FIG. 4 is a sectional view along the lines 4—4 of FIG. 3;

FIG. 5 is a sectional view along the lines 5—5 of FIG. 3;

FIG. 6 is a sectional view along the lines 6—6 of FIG. 3;

FIG. 7 shows a second form of the invention greatly enlarged in size when compared to FIG. 2;

FIG. 8 is a greatly enlarged detail of the second form of invention shown in FIG. 7, partly in section and partly in elevation;

FIG. 9 is a sectional view along the lines 9—9 of FIG. 8;

FIG. 10 is a greatly enlarged sectional detail, partly in section and partly in elevation, similar to FIG. 3 but showing a third form of the invention;

FIG. 11 is a sectional view along the lines 11—11 of FIG. 10 (with plug 128 left out);

FIG. 12 is a sectional view along the lines 12—12 of FIG. 10;

FIG. 13 is a greatly enlarged sectional detail, partly in section and partly in elevation, similar to FIG. 3, showing a fourth form of the invention; and FIG. 14 is a sectional view along the lines 14—14 of FIG. 13 (with plug 150 left out).

Similar numerals refer to similar parts throughout the several views.

DESCRIPTION OF THE INVENTION

The seal illustrated in the first embodiment, FIGS. 1 through 6 of the drawings, comprises a body portion 20 comprising an elongated shank 22, a socket means 24 and a plug means 26. An opening 28 may be provided for ease in securing a number of seals together in bundles by means of string, thread or other such means. This is especially convenient when seals are numbered consecutively for coding or other purposes and its is desired to have the consecutively numbered seals secured together for shipping and storage. The entire device may be molded from a suitable plastic material such as, for example, polypropylene, polyethylene, nylon or similar material which is relatively rigid but yet may be flexible in an elongated thin portion such as the shank 22 and which is sufficiently resilient to be deformed temporarily to some extent as will appear in connection with the description of the deformable resilient coupling means of the invention hereinbelow.

The socket means 24 comprises a housing 30 having a through opening 32 with a first end 34 and a second end 36. Located between the ends 34 and 36 there is at least one lateral locking surface 38 extending inwardly from the housing 30 toward the center of the opening 32. Between the locking surface 38 and the second opening 36, there is at least one bevelled portion 40 having an end 42 at approximately the same distance from the center of the opening 32 as end 44 of the lateral locking surface 38. In the preferred embodiment, the through opening 32 is provided with at least a pair of locking surfaces 38 and at least a pair of bevelled portions 40. The plug means 26 has a leading end 50, a trailing end 52 and a pair of side members 54 and 56 forming a frame 58 for the plug means which form closed perimeter means outlining space means such as a central open space 60. The plug 26 also has at least one, preferably a pair of locking surfaces 62 and 64 attached respectively to side members 54 and 56 as well as a bevelled portion for each side member such as portions 66 and 68. The material of the plug sides 54 and 56 is resilient so that when pressure is applied to the bevelled portions 66 or 68 of the side members 54 or 56, individually or simultaneously, the side members will be deformed from their normal shape toward the center of the plug and into the space 60, and when the pressure is removed, the resilient material, having memory, will resume their original normal shape.

OPERATION OF THE SEAL

A seal constructed in accordance with the specification herein and as illustrated in FIG. 1 of the drawings is placed through a hasp (not shown) with the shank 22 in the position of a staple. The shank 22 is then looped so that the leading end 50 of the plug 26 may be inserted into the second opening 36 of the socket means 24. When the bevelled portions 66 and 68 of the plug 26 engage the bevelled portions 40 and 70 of the socket 24, further pressure to force the plug 26 into the socket will cause the side members 54 and 56 to deform laterally and inwardly into the space 60. This will permit outer edges 72 and 74 of the locking surfaces of the plug to deflect inwardly and pass outer edges 44 and 76 of locking surfaces 38 and 78 in the socket 24. As the respective outer edges pass each other and disengage, the inward lateral pressure on the sides 54 and 56 of the plug will be relieved permitting the sides 54 and 56 to resume their normal shape outside of space 60 and causing locking surfaces 38, 62, 64 and 78 to assume facing opposed positions forming a permanent seal. A permanent seal is formed because once the plug 26 has been placed into the socket 36 as aforesaid, there is no way of deforming the sides 54 and 56 without destroying the socket. The leading end 50 and the trailing end 52 of the frame 58 of the plug means 26 are made of a size in cross section to be in close tolerance with the first opening 34 and the second opening 36 of the socket 24. This will not permit the insertion of a tool or any foreign item to break the seal without breaking the parts themselves. The frame end 50 prevents the sides 54 and 56 from collapsing on each other to permit the seal to be worked out by jiggling or jostling the seal. I may also provide ribs 80 on the plug 26 which will fit into recesses or grooves 82 on the socket 24 to provide for alignment and greater stability.

I may also provide a closure 86 for the first end 34 of the socket 24 to provide for greater protection of the seal. This may be made of the material of the seal itself. In molding the seal, extra material may be molded into the seal at points 86a and 86b which can then be folded toward each other and formed into an integral closure 86 by any means known to the molding art.

In FIGS. 7 and 8 of the drawings, I show a second form of invention substantially similar to the first form of seal described in FIGS. 1 through 6 of the drawings with the exception that it is substantially smaller and thinner. The shank 100 is in the form of a filament, and the plug 102 has a nose portion 104 which is shown somewhat rounded, as shown, or pointed, so that the plug may be pushed through the weave of a garment or other type of material before looping the shank 100 to place the plug 102 into the socket 106. A tag such as tag 108 or some other item may thus be attached to a fabric, a dress or other article having a weave or knitted construction providing spacing through the material. This permits the material to be tagged by means of a tamperproof seal such as the seal 110 of FIGS. 7 and 8. The nose 104 is pushed through the fabric through a space in the weave and then looped to make a seal as described hereinabove by placing the plug 102 in the socket 106. This insures that the tag 108 which may contain pricing information will remain with the garment or fabric. If the tag is removed by an unauthorized person, he will necessarily have to break the seal.

The construction of seal 110 has a circular locking surface 120 which goes around the inside of its socket 106 and is engaged by lateral locking surfaces 122 and 124 of the plug 102 in the manner described hereinabove for the engagement of plug 26 with socket 24. In all other respects, the form of seal in FIGS. 7 and 8 has the same mechanical features and construction as the first form of the invention.

In FIGS. 10, 11 and 12 of the drawings, a third form of invention is shown which is substantially similar in operation and in structure to the first form of invention with two differences. First, the frame 130 of the third form of invention is provided with a web means 132 in place of the space 60 of frame 58 of the first form of invention. In its preferred form, the web means 132 is made of the same material as the frame 130, for example, polypropylene, polyethylene, nylon or similar material which is relatively rigid but yet flexible, resilient and deformable as aforesaid. It is also preferable to make the web means 132 relatively thinner than the thickness of the material of the frame 130 as illustrated in FIG. 12. The web means 132 has the advantage of providing greater strength to the construction of the frame 130 of the plug 128 without sacrificing the necessary qualities of deformability and resiliency.

The web means of this invention may completely fill the space within the frame means, or be positioned within at least a portion of the space within a frame means. It is, therefore, apparent that the term "web means" as used herein signifies a connecting material which will fill at least a portion of a space as described hereinabove.

A second difference in construction between the first form of invention and the third form of invention is the treatment of the construction which supports locking surfaces 134. (These locking surfaces are similar in function to locking surfaces 78 of the first form of invention illustrated in FIG. 3). Locking surfaces 134 are formed on internal extensions 136 of the material of the socket 138 of the third form of invention. The internal extensions 136 are spaced internally from the body of the socket 138 to provide spaces 140 between them and the body of the socket 138. A preferred construction provides for two internal extensions 136 as illustrated in FIG. 10 of the drawings; however, the invention may be designed with any number of such extensions as desired to accomodate any number of locking surfaces 142 as may be desired on the plug 128.

The advantage of providing the spaces 140 between the internal extensions 136 and the body of the socket 138 is that the locking action of the device as described hereinabove in the first form of the invention will be facilitated by rendering the extensions 136 slightly more deformable because of their extension from the main body 138. This provides for ease in locking without sacrificing the safety seal features of the device. In addition, pressures on the outside of the socket 138 applied to distort the socket 138 to separate locking surfaces 134 will have less effect on such locking surfaces because of the spacing which partially separates them from the main body of the socket 138. Thus, this construction provides for easier locking and more positive freedom from dislodgment.

A fourth form of invention is shown in FIGS. 13 and 14 of the drawings. In this form, plug 150 represents any of the plugs previously described so long as it has at least a pair of locking surfaces such as surfaces 152. Socket 154 is somewhat similar to socket 138 except that it is provided with an annular locking surface 156 which is positioned centrally within socket 154 at the end of a tubular formation 158. It is to be noted that tubular formation 158 is spaced inwardly from the material of the body of socket 154 and has the same advantages as the spacings 140 in socket 138 of the third form of the invention. It is to be understood that where practicable, constructions of the invention may be made by selecting any one of the plugs 26, 102, 128 or 150 and any one of the sockets 30, 106, 138 or 154 to make a seal device in accordance with the invention.

There is another feature which is applicable to all forms of the invention which provides for a better seal when the elements are connected together. This involves slanting the locking surfaces 62 and 64 of the plug 26 so that outer edges 72 and 74 are further away from the leading end 50 than the inner edges of said surfaces. This makes the lateral locking surfaces 62 and 64 into more of a hook or barb shape as shown in FIG. 3 of the drawings. A similar construction may be provided for locking surfaces 122 and 124 of the form of invention shown in FIG. 8. Provision may also be made for slanting the locking surfaces 38, 76 and 120 of the plugs 26 and 102 respectively as shown in FIG. 3 and FIG. 8 of the drawings respectively to reinforce the barb formation of the plug locking surfaces. Slanting these surfaces will improve the quality of the seal. After the connections are made, if one tries to pull the plug out of the socket, the barbed locking surfaces of the plugs will tend to spread outwardly and jam and make a better seal.

Similar provision may be made with respect to locking surfaces 134 and 142 as shown in FIG. 10 and locking surfaces 156 and 152 as shown in FIG. 13.

While I have described my invention in its preferred forms, there are other forms which it may take without departing from the spirit and scope of the invention, and I, therefore, desired to be protected for all forms coming within the claims hereinbelow.

Wherefore I claim:

1. A seal comprising an elongated flexible body portion, including socket means and plug means intended for reception in the socket means, said plug means comprising leading end means, trailing end means and side means, all forming closed perimeter means outlining space means central to the plug means, said plug means being comprised of resilient material with at least one lateral locking surface extending from at least one side member of said plug means and at least one complimentary lateral locking surface comprised within the socket means in a through opening thereof, said plug means having an outside configuration from said lateral surface to said trailing end substantially complementary to the corresponding inside configuration of the through opening of the socket means with the cross section area of the trailing end of the plug means formed to be in relatively close tolerance with the cross sectional area of the internal configuration of a corresponding end of the through opening of the socket means, said plug means being substantially enveloped by said socket means in engaged position, in which said side member comprising said locking surface is movable toward said control space means and both mentioned lateral locking surfaces of the plug and the socket cooperate to form deformable resilient coupling means providing a positive seal when said plug means and said socket means are together with said lateral locking surfaces in opposing facing relationship.

2. A seal as claimed in claim 1 comprising resilient web means positioned within at least a portion of said space means.

3. The seal as claimed in claim 1, in which the lateral locking surface of the socket means is positioned within said opening in spaced relationship to the socket means.

4. The seal as defined in claim 1, in which auxiliary cover means are provided to cover the end of the through opening of the socket means adjacent the leading end of the plug means.

5. The seal as claimed in claim 1, in which the elongated flexible body portion is in the form of a strap.

6. The seal as claimed in claim 1, in which the elongated flexible body portion is in the form of a filament, and the leading end of the plug means has a nose portion.

7. The seal as claimed in claim 1, in which the plug means is provided with at least one longitudinal rib and the socket means is provided with at least one longitudinal groove to receive the rib of the plug means.

8. The seal as claimed in claim 1, in which the frame means of the plug means has a pair of opposed sides of resilient material, each side having a lateral locking surface and in which the socket means comprises a pair of lateral locking surfaces in the form of internally extending diametrically opposed shoulders.

9. The seal as claimed in claim 8, in which the socket means comprises a pair of locking surfaces positioned to be in facing relationship to the lateral locking surfaces of the plug means when the plug means is within the socket means, said locking surfaces of said socket being disposed on extensions within the socket positioned in spaced relationship to the body of the socket.

10. The seal as claimed in claim 9, in which the frame means of the plug means is provided with resilient web means within the rectangle form of the frame means.

11. The seal as claimed in claim 1, in which the perimeter means of the plug means outlines a rectangular space with the side means of the plug means having lateral locking surfaces and in which the socket means comprises a pair of lateral locking surfaces in the form of internally extending diametrically opposed shoulders.

12. The seal as claimed in claim 8, in which the lateral locking surfaces have inner and outer edges, and the inner edges of at least the lateral locking surfaces of the plug means are positioned closer to the leading end of the plug means than the outer edges of said locking surfaces.

13. A seal as claimed in claim 12, in which the plug means has at least one bevelled portion between said leading end and said plug means locking surface, and said socket means having at least one bevelled portion within the through opening positioned between its first end and the socket means locking surface, with said deformable coupling comprising at least the locking surface of the plug means and the bevelled portion of the plug means positioned to be engaged by the bevelled portion of the socket means to provide for deformation of the resilient side member of the plug means by engagement of the said bevelled portions during insertion of the plug means into the socket means from the normal shape of the frame of the plug means to a deformed shape wherein the resilient side member is laterally deformed from normal shape toward the center of the plug frame, and when the plug means is positioned within the socket means opening, the bevelled portion will be disengaged permitting the deformed side member to resume undeformed normal shape with its locking surface in faced opposing position to the locking surfaces of the socket means.

14. The seal as claimed in claim 1, in which the lateral locking surface of the socket means has an annular form.

15. The seal as claimed in claim 14, in which the annular lateral locking surface of the socket means is formed on a tubular formation within the through opening of the socket means, said tubular formation being in spaced relationship to the said through opening.

16. The seal as claimed in claim 15, in which the frame means of the plug means is provided with resilient web means therein.

* * * * *